J. A. BOOTH.
CAN SOLDERING MACHINE.
APPLICATION FILED JULY 17, 1909.
1,000,369.
Patented Aug. 15, 1911.
2 SHEETS—SHEET 1.
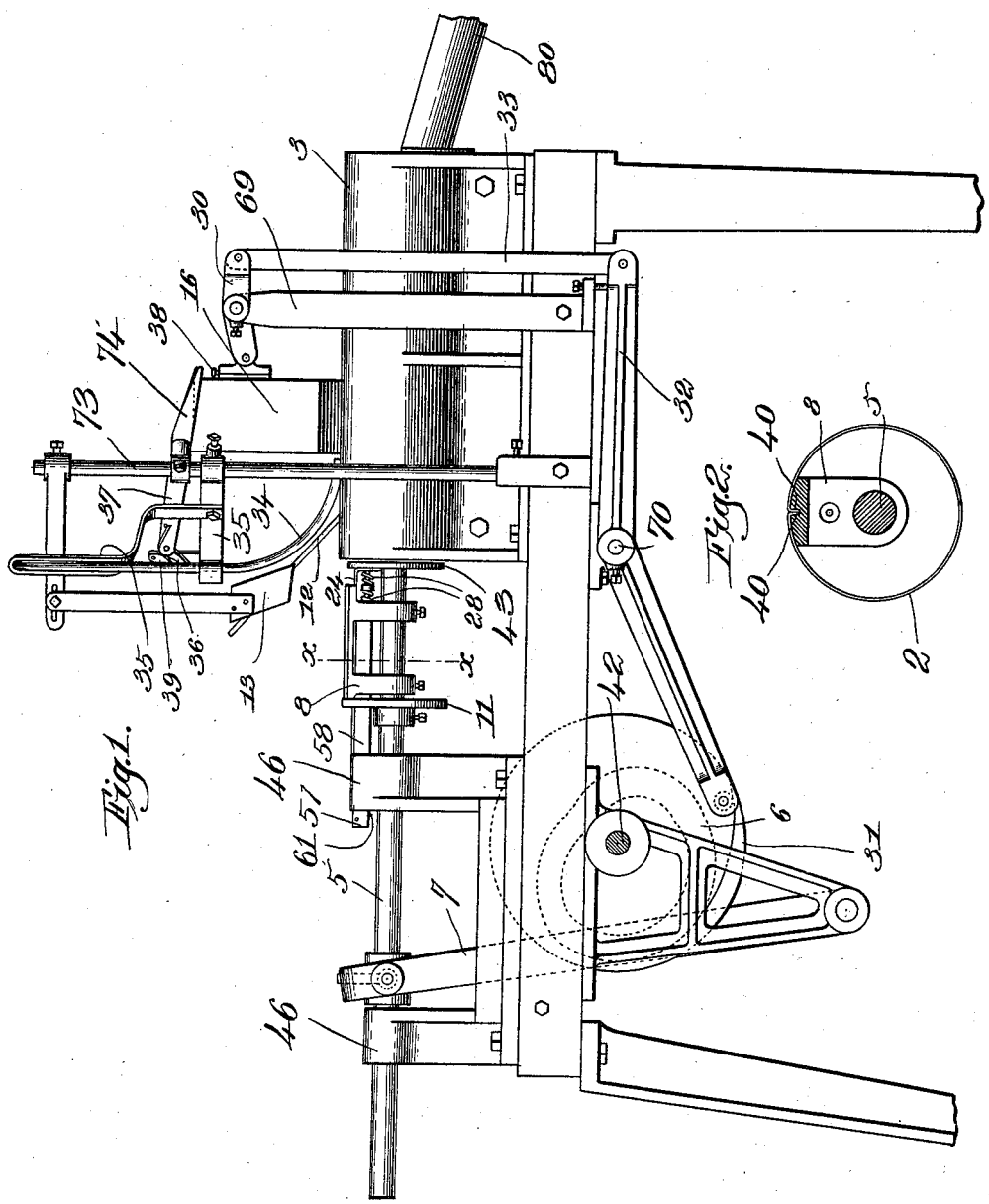

J. A. BOOTH.
CAN SOLDERING MACHINE.
APPLICATION FILED JULY 17, 1909.
1,000,369.
Patented Aug. 15, 1911.
2 SHEETS—SHEET 2.
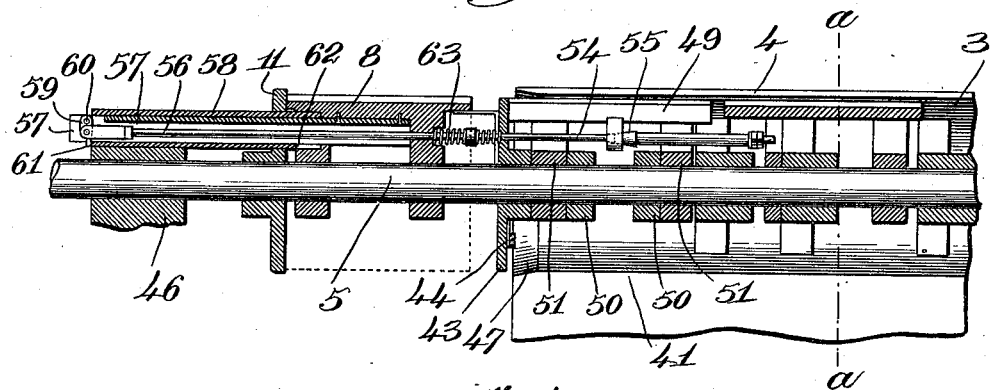
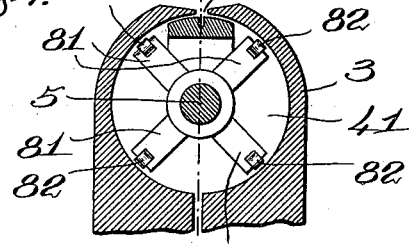
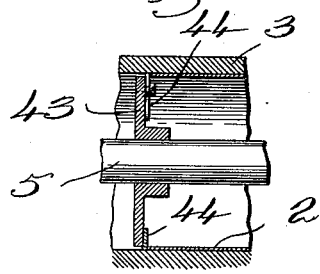
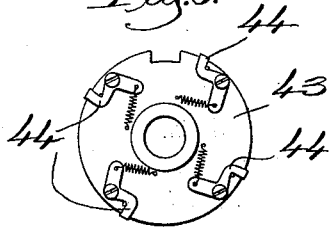
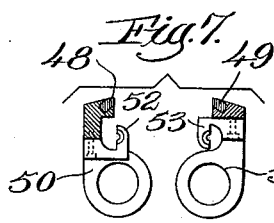
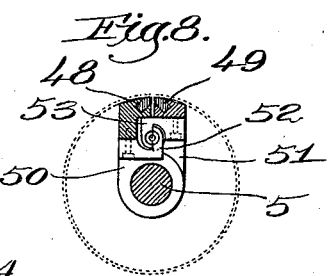
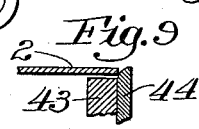
Witnesses.
Thomas J. Drummond
Joseph M. Ward.
Inventor.
James A. Booth
by Dudley Gregory
attys.
COLUMBIA PLANOGRAPH CO., WASHINGTON, D. C.

UNITED STATES PATENT OFFICE.

JAMES A. BOOTH, OF EVERETT, MASSACHUSETTS, ASSIGNOR OF ONE-HALF TO ROSELLE WYLLYS AND ONE-HALF TO ERNEST L. GAY, BOTH OF BOSTON, MASSACHUSETTS.

CAN-SOLDERING MACHINE.

1,000,369.  Specification of Letters Patent. Patented Aug. 15, 1911.

Application filed July 17, 1909. Serial No. 508,206.

*To all whom it may concern:*

Be it known that I, JAMES A. BOOTH, a citizen of the United States, residing at Everett, county of Middlesex, and State of Massachusetts, have invented an Improvement in Can-Soldering Machines, of which the following description, in connection with the accompanying drawing, is a specification, like characters on the drawing representing like parts.

This invention relates to can-soldering machines and especially to a machine adapted to form the side seam in a can body.

The machine herein illustrated is one adapted to solder the side seam of a can formed with a butt seam wherein the edges of the blank from which the can body is formed are bent inwardly and are abutted together. The apparatus is automatic in its operation and is adapted to receive a blank from which a can body is to be made, hold said blank with the two edges to be soldered in proper relative position, and to apply the solder, thereby soldering the joint, these several operations being performed automatically as the can is moved from one point in the machine to another.

I will first describe one embodiment of my invention and then point out the novel features thereof in the appended claims.

In the drawings, Figure 1 is a side view of a machine embodying my invention; Fig. 2 is a section on the line $x$—$x$, Fig. 1, showing a can held in position on the positioning device; Fig. 3 is a longitudinal section taken substantially on the line $y$—$y$, Fig. 4; Fig. 4 is a section on the line $a$—$a$, Fig. 3; Figs. 5 and 6 are details of the can-feeding mechanism; Figs. 7 and 8 are details showing the gripping jaws for holding the edges of the butt seam tightly together during the soldering operation. Fig. 9 is a detail of one of the can-feeding pawls.

The machine herein shown is one adapted to form a can body 2 having the construction shown in Fig. 2, that is, one with a butt joint formed by bringing and soldering together two inturned flanges 40 that are formed on the edges of the blank from which the body is made.

The improved machine comprises a can-holding member 3 which is adapted to hold the blank while the soldering is done, means to feed the blanks successively through this can-holding member, means to grip the inturned flanges 40 and hold them tightly together while the soldering is being done, and solder mechanism adapted to solder the seam.

The can-holding member 3 is provided with a cylindrical bore 41 agreeing with the size of the can. This can-holding member is shown as provided at its upper side with a slot 4 in which the soldering iron 16 operates, and the can body 2 is fed through said bore 41 in such a position that the seam comes directly underneath the slot. Each can body is fed into and through the can-holding member 3 by means of a can-feeding mechanism herein shown as a reciprocating rod or bar 5 extending into the bore 41 and provided with means (presently to be described) adapted to position the can body and to feed it forward. The rod 5 is mounted to slide in suitable bearings 46 and is operated by a cam 6 which is carried on the driving shaft 42, said cam actuating a lever 7 that has a pivotal connection with the rod. Mounted on the rod 5 is a collar or flange 11 against which the end of the can body is placed, and also a support 8 having a groove therein adapted to receive the inturned flanges 40 of the can body, as clearly seen in Fig. 2. The support 8 and the flange 11 constitute a positioning device for holding in proper position each blank before it is fed into the can-holding device 3. When the rod or bar 5 is in its retracted position the can-positioning device is situated outside of the bore 41, as shown in Figs. 1 and 3. The blank from which the can body is to be made is placed on the positioning device when the latter occupies this position so that the end of the body will rest against the flange 11 and the lips 40 will occupy the groove in the rest 8. As the rod 5 moves to the right, Fig. 1, the can body is carried into the bore 41, the movement of the rod being preferably just sufficient to carry the can body fully into the holding member 3. The bore 41 of the can-holding member 3 is flared at one end, as at 47 (see Fig. 3) to permit the can to freely enter. When the can body is confined in the bore, there will be sufficient frictional engagement between the can body and the walls of the bore so that when the rod 5 returns to its initial position the can body will remain in the can-holding member.

The rod 5 has fast thereon a flange or collar 43 carrying spring-pressed fingers 44, each of which is pivoted to the collar and is beveled on one side, as seen in Fig. 9. As the rod 5 moves backwardly, the collar 43 will pass through the can body confined in the bore 41 and the fingers 44 will snap over the end of the can body, as shown in Fig. 5. During the next stroke forward of the rod 5 the fingers 44 will carry the can body forward and during this forward movement the lips 40 are gripped and tightly held together and the soldering operation is accomplished. For clamping the two lips 40 together while the soldering is progressing, I have provided two clamping jaws 48 and 49 which are adapted to engage the lips 40, as shown in dotted lines Fig. 8, and have also provided a device for moving said jaws toward each other to firmly grip the lips 40 during the forward movement of the rod 5 and to release said jaws during the backward movement of said rod. The jaw 48 has associated therewith two arms 50 which encircle and are pivotally mounted on the rod 5, and the jaw 49 has two similar arms 51 which also loosely surround the rod 5. The jaw 48 is formed with an upturned finger 52, and the jaw 49 is formed with a downturned finger 53. These two fingers are so situated that when the jaws are in operative position they lap by each other, as seen in Fig. 8. A jaw-actuating rod 54 extends between the fingers 52 and 53 and is provided with a conical or wedge portion 55 which is adapted to act on the fingers thereby to clamp the jaws together when the rod 54 is moved to the left Fig. 3. I have provided means for giving the rod 54 its movement to the left during the time that the rod 5 is moving toward the right. I accomplish this herein by providing the rod 54 with the extension 56 which is pivotally connected to a finger 59 that in turn is pivoted to an arm 57 that extends rearwardly from and is secured to the rest 8. The arm 57 plays through a tubular guide 58 and the finger 59 is of such a length that when the parts are in their normal position, as shown in Fig. 3, the end 61 has engagement with the end of the tubular guide 58. The guide 58 is stationary, it being fixedly carried by the bearing 46. Since the arm 57 is connected to the rest 8, it will be observed that said arm will move to the right with the rod 5. When, therefore, the rod 5 does move to the right, the end 61 of the finger 59 will, by its engagement with the fixed guide 58, serve to draw the rod 54 rearwardly or to the left Fig. 3 thereby causing the cam portion 55 to act on the fingers 52 and 53 and to close the jaws together. When the rod 5 has completed its forward movement, the end 61 of the finger will pass off from the end 62 of the tubular guide 58 and the spring 63 will return the rod 54 to the right. When the rod 5 begins its backward movement the finger 61 will engage the end 62 of the tubular guide 58 and the cam portions 55 will thus be positively withdrawn from between the fingers 52, 53, thus permitting them to release their grip on the lips 40 of the can body.

As stated above, the side seam of the can is soldered during the forward movement of the can body through the bore 41, and while the lips 40 of the can body are gripped between the jaws 48, 49. The soldering is accomplished by means of a soldering iron 16 which may be heated in any suitable way and which is herein shown as sustained on a lever 30 that in turn is carried by a support 69. This lever 30 is connected by a link 33 with another lever 32 that is pivoted to the frame at 70, said lever 32 being acted upon by a suitable cam 31 mounted on the shaft 42. This connection results in giving a rising and falling movement to the soldering iron 16, said iron being elevated from the holder 3 when the rod 5 is being moved backwardly and being depressed into its operative position while the rod 5 is moving forwardly. The solder may be fed to the machine in the form of a wire 34 and any suitable means for feeding said solder may be employed. I have herein shown a feeding pawl 36 that is adapted to engage the wire 34 and this is carried by a lever 37 that is pivoted to a standard 73. Said lever has an extension 74 that is connected to the soldering iron so that the movement of the soldering iron will rock the lever 37 and thus feed the solder forward. 39 is a stop pawl to prevent backward movement of the solder wire. This wire is guided by a suitable guide 35.

13 designates a tank containing acid or some similar material which is delivered to the can for cleaning the latter by means of a wick or other device 12.

The operation of the machine will be readily understood from the foregoing, but may be briefly summarized as follows: A can body blank is placed on the rest 8, as shown in dotted lines Fig. 3 and in full lines Fig. 2, when the parts are in their normal position as shown in Fig. 1. When the machine is started, the rod 5 moves to the right carrying the can body blank into the bore 41. When the rod 5 moves backwardly, said blank will remain in the bore because of the frictional contact between the blank and the walls of the bore and the beveled ends of the fingers permit them to pass into the interior of the blank without moving the blank backwardly. When the rod 5 completes its backward movement, the fingers 44 snap over the end of the can body 2, as shown in Fig. 5, and at this time another blank is placed on the rest 8. During the next forward movement of the rod 5, the lips 40 are clamped together by the jaws 48, 49, and the first can body passes underneath the soldering iron, while the soldering is done while the second can body is passed into the bore 41. Upon the next backward movement of the rod 5, both can bodies remain in the bore and at the end of the return stroke another can body may be placed on the rest 8. During the next forward movement the third can body is carried into the bore, the second can body is soldered as above described, and the first is forced out through the delivery end of the holder 3 by the second can body, the completed can body being discharged into a chute 80 which conveys it to any desired place. The rod 5 may be guided in its reciprocating motion by arms 81 secured thereto which are provided with rolls 82 that rest against and roll over the walls of the bore 41.

I have shown herein one embodiment only of my invention.

Having fully described my invention, what I claim as new and desire to secure by Letters Patent is:—

1. In a can-soldering machine, the combination with a can-holder having a bore to receive a can body to be soldered, means to feed into said bore a can body which has inturned edges adjacent the seam, means operating within the can body when it is in the bore to grip and hold tightly together the inturned edges of the can adjacent the seam and to apply solder to the seam.

2. In a can-soldering machine, the combination with a can-holder having a cylindrical bore, of a reciprocating rod extending into said bore, means thereon to feed a can body into the bore, a pair of gripping jaws carried thereby to hold the edges to be soldered together, and solder-applying mechanism.

3. In a can-soldering machine, the combination with a can-holder having a cylindrical bore to receive a can body made from a blank having inturned lips at its meeting edges, of means to feed said can body into the bore, a pair of jaws, and means to cause said jaws to grip the lips of the can body during the forward feeding movement thereof.

4. In a can-soldering machine, the combination with a can-holder having a cylindrical bore, of a reciprocating bar, means associated therewith to feed a can-body into said bore, a disk carried by said bar, spring pawls carried by the disk and adapted to engage the can body for giving it a further feeding movement as the bar moves longitudinally in the bore, a soldering iron, and means to lift the iron as the bar moves backwardly.

5. In a can-soldering machine, the combination with a can-holder having a cylindrical bore, of a reciprocating bar, means associated therewith to feed a can body into said bore, a disk carried by said bar, radially-movable spring pawls carried by the disk and adapted to engage the can body for giving it a further feeding movement, a pair of gripping jaws, means to cause said jaws to grip inturned lips on the edges of the can body during the forward movement of the bar, and solder-applying mechanism.

6. In a machine for soldering a butt seam on a can body blank having inturned lips at its edges, the combination with jaws adapted to be received within the can body, of means to give said jaws and a can body blank a relative movement to cause the jaws to enter said can body, means to operate said jaws to cause them to grip said lips thereby to press them closely together, and means to apply solder to the exterior of the can.

7. In a machine for soldering a butt joint in a can body blank having inturned lips at its edges, the combination with lip-gripping jaws, of means to feed a can body blank over said jaws so that the latter will pass through said body, means to cause the jaws to grip the lips together as the can body moves forward, and means to apply solder to the joint.

8. In a machine for soldering a butt seam on a can body blank having inturned lips at its edges, the combination with a can holder having a bore through which the can body can be passed, of a reciprocating member, means associated therewith to feed a can body into said bore, a pair of lip-gripping jaws carried by said reciprocating member, and means to cause said jaws to grip the inturned lips on the edges of the can body during the forward movement of the member and to release said jaws during the backward movement of said member.

In testimony whereof, I have signed my name to this specification, in the presence of two subscribing witnesses.

JAMES A. BOOTH.

Witnesses:
LOUIS C. SMITH,
THOMAS J. DRUMMOND.